Nov. 3, 1942.　　W. J. OESTERLEIN ET AL　　2,300,732
ARC-WELDING GENERATOR
Filed April 19, 1939　　2 Sheets-Sheet 2
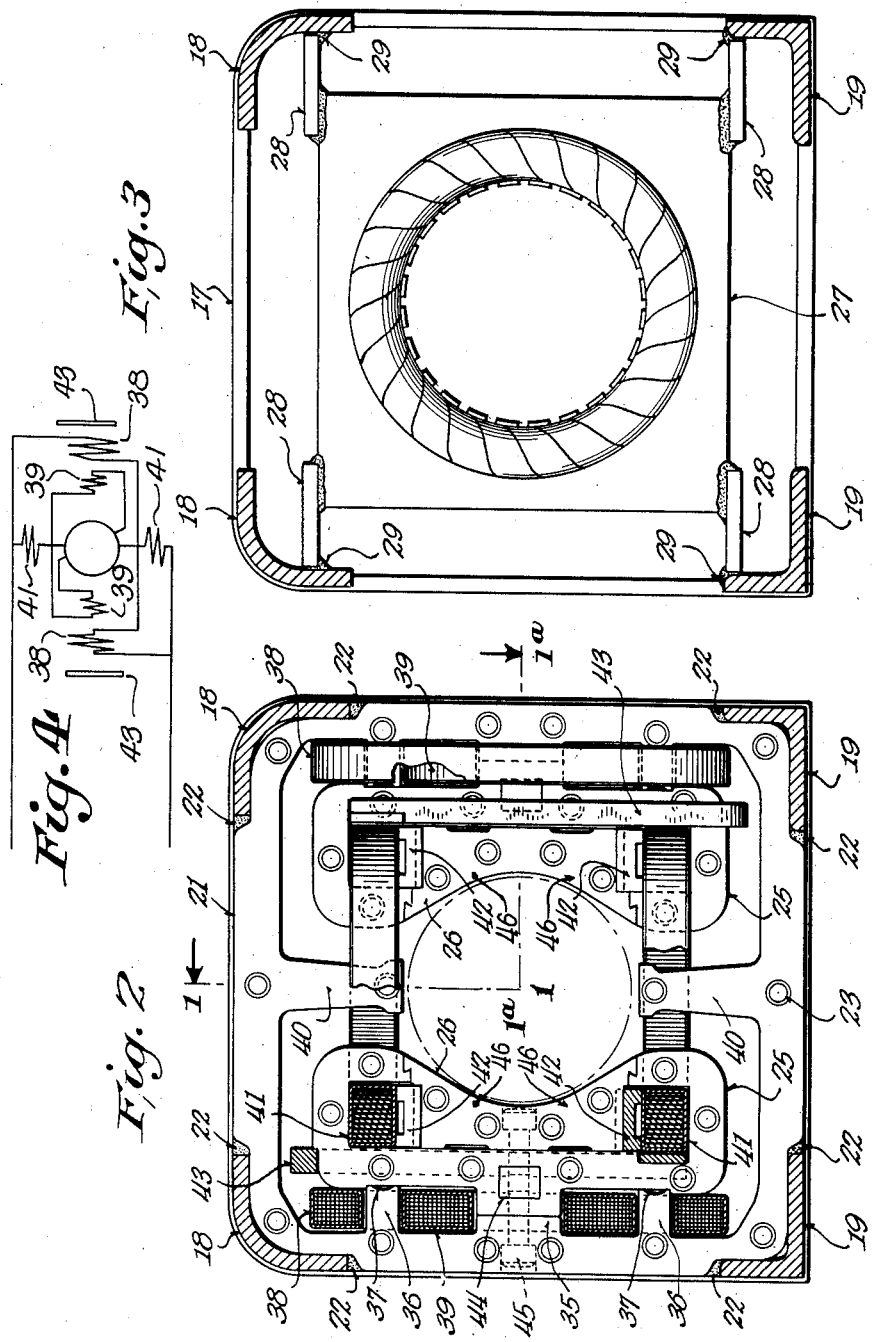
INVENTORS
William J. Oesterlein
Karl A. Blind
BY Louis Quarles
ATTORNEY.

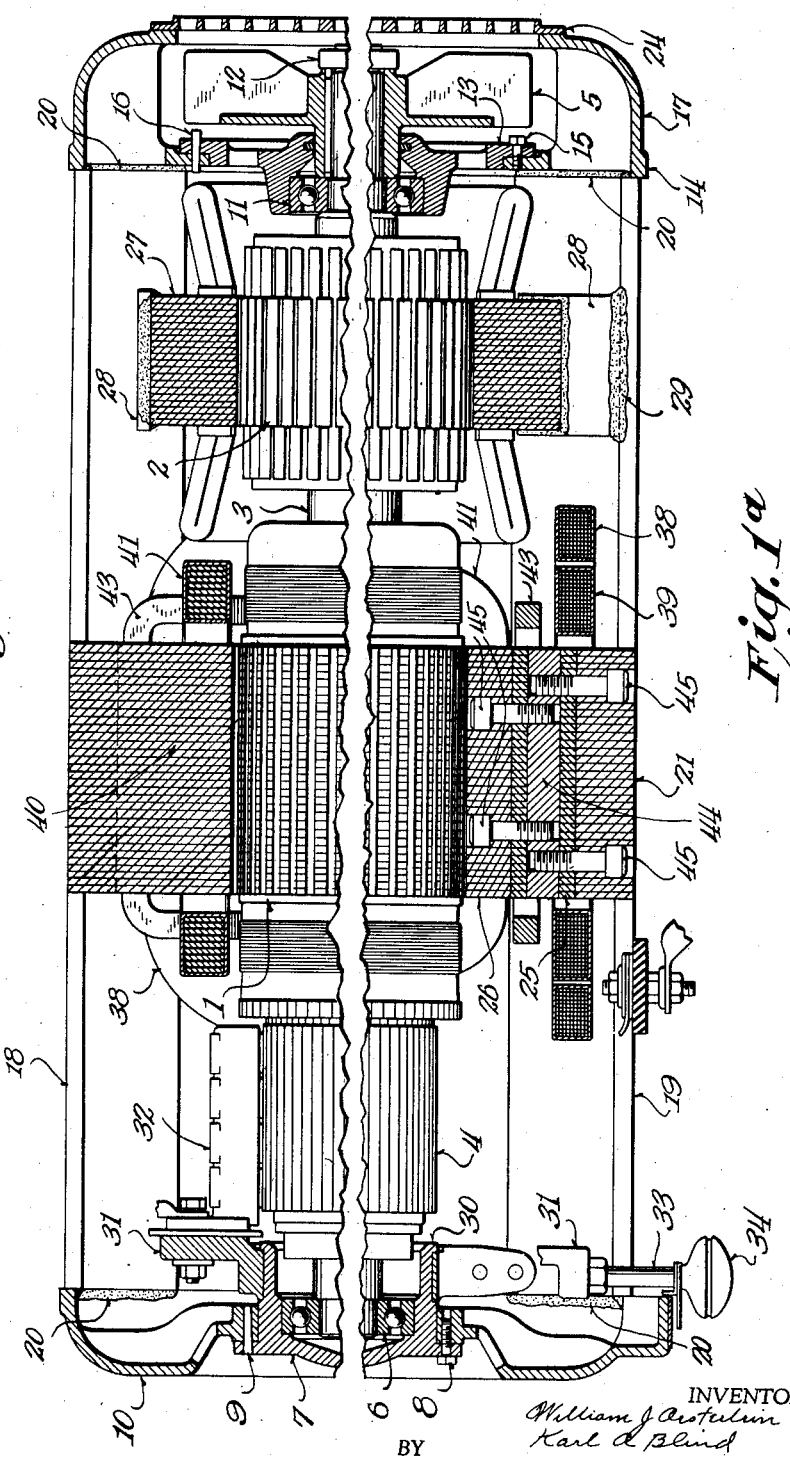

Patented Nov. 3, 1942

2,300,732

UNITED STATES PATENT OFFICE 2,300,732

ARC-WELDING GENERATOR

William J. Oesterlein and Karl A. Blind, Milwaukee, Wis., assignors to Harnischfeger Corporation, Milwaukee, Wis., a corporation of Wisconsin Application April 19, 1939, Serial No. 268,684

6 Claims. (Cl. 171—252)

This invention relates to electric generators having special adaptability for generating current supply for arc welding and also to the construction thereof in conjunction with an electric motor forming a novel and highly advantageous form of motor generator. The invention resides in a structural arrangement of mechanical and electrical parts in which longitudinal frame members are secured to the exterior of the generator field frame and extend in the general direction of the armature shaft, to the ends of which frame members end-plates are secured, the end-plates being provided with bearing cages for support of the rotatable armature shaft, at least one of said bearing cages being of sufficient size to permit withdrawal of the rotating parts of the generator without removal of an end-plate, the arrangement being particularly well adapted to the employment of a polygonal field frame having novel and enhanced magnetic properties.

Heretofore, in the construction of direct current generators, it has been common practice to provide a solid, circular, iron field frame to the interior of which the pole-pieces are attached. In addition to its electro-magnetic functions, the field frame usually serves certain mechanical purposes. In many instances the field frame is the principal structural support of the entire machine. The use of solid metal field frames has thus been occasioned to a large extent by mechanical considerations. In most direct current generators there is little or no electro-magnetic disadvantage in the solid field frame, but for arc-welding services, where the current fluctuations (called "transients") are abrupt, severe, and frequent, lamination of the field frame is advantageous.

In spite of the electro-magnetic advantages of the laminated field frame in welder generators, machines having such a field frame have been little used because of their mechanical defects and bulky character.

In contrast with welding generators as heretofore constructed, the generator, or motor generator, of this invention employs a laminated generator field frame and at the same time is compact in form, light in weight, of great mechanical strength and rigidity, and adapted to a form of field arrangement having enhanced magnetic properties. In addition, the apparatus of this invention is unusually accessible for adjustment and repair, and easily ventilated for dissipation of heat.

This invention is herein described with the aid of the accompanying drawings, which form a part hereof and in which Fig. 1 is a sectional view of an apparatus of this invention viewed through the plane 1—1 indicated in Fig. 2;

Fig. 1a is a sectional view of an apparatus of this invention viewed through the plane 1a—1a indicated in Fig. 2

Fig. 2 is an end section with rotating parts removed, showing generator field structure; and Fig. 3 is an end section with rotating parts removed, showing stationary parts of the motor.

Fig. 4 is a wiring diagram of the generator.

The drawings depict one instance of the apparatus of this invention, the same being embodied as shown in Fig. 1 and in Fig. 1a in the form of a motor generator having a generator armature 1 and a motor rotor 2 mounted upon rotatable shaft 3. Also mounted upon rotatable shaft 3 to turn therewith are the other common rotating parts of a motor generator such as the commutator 4 and the ventilating fan 5. The left-hand end of the shaft 3 is inserted into the inner race of a bearing 6, which is held in turn in a cage 7, which in turn is located and secured in place by means of bolts 8 and and locating dowels 9 upon the end-plate 10, which is a part of the main structural support of the entire apparatus. It will be noted that by reason of this construction the left-hand end of rotatable shaft 3 may be withdrawn from the bearing 6, when desired.

The right-hand end of rotatable shaft 3 passes through and is secured to the inner race of a bearing 11 and is secured as shown by means of a key and the locking-nut 12 to the ventilating fan 5, which has previously been mentioned. The bearing 11 is supported and held within the bearing cage 13, which is large in diameter and which in turn is mounted in an aperture in a right-hand end-plate 14 and there securely held and accurately located by means of the bolts 15 and the locating dowels 16. The right-hand end-plate 14 likewise forms a part of the main supporting structure of the apparatus and is provided with a housing portion 17 for housing the fan 5, which housing portion is closed by the open grill 24.

End-plates 10 and 14 form a part of the main supporting structure of the machine as above referred to through rigid engagement with longitudinal frame members which run from end to end of the apparatus around the exterior thereof. In each figure of the drawings the two upper longitudinal frame members bear the designating numeral 18 and the two lower longitudinal frame members bear the designating numeral 19. For the sake of strength, the longitudinal frame members are preferably formed of steel angle shapes, as shown, and the rigid engagement thereof with the end-plates 10 and 14 is preferably effected by means of the fusion weld 20, clearly shown in Fig. 1.

Within the rectangular enclosure established by the longitudinal frame members, a generator field ring is positioned so as to engage the inner faces of said longitudinal frame members. The field ring is designated by the numeral 21 and is composed of laminations, as clearly shown in Fig. 1. The field ring 21 is preferably of generally rectangular configuration, as shown in Fig. 2, in which form certain peculiar advantages of the apparatus of this invention may be availed of, as more fully described below. In order to render the positioning of the field ring 21 permanent with reference to the longitudinal frame members 18 said field ring is united to said longitudinal frame members by means of fusion welds 22. In this way and in spite of the laminated character of the field ring 21 the same acts to lend great rigidity and strength to the mechanical framework of the entire apparatus, thus giving rise to mechanical strength characteristics in a laminated field ring not heretofore availed of. The fusion welds 22 serve not only to securely position the laminated field ring 21 with respect to the longitudinal frame members, but such welds also serve to unite said laminations in such fashion as to greatly augment the mechanical strength characteristics of said field ring. For convenience in assembly said field ring 21 is further strengthened and held together by means of the usual rivets, one of which is designated by the numeral 23 in Fig. 2.

In assembling the parts of the apparatus thus far described, longitudinal frame members 18 and 19 are preferably united with field ring 21, as the first steps of assembly. The generator pole-pieces, composed of intermediate portions 25 and face portions 26, are then securely fastened in place. Thereafter a motor stator 27, formed of laminations as shown and provided with brackets 28 welded thereto, is placed in the position shown in Figs. 1, 1a and 3.

To facilitate assembly and to insure precision in the alignment of parts, a precisely made mandrel, having portions dimensioned to fit the aperture in end-plate 10, the circular opening between generator pole-pieces, the circular opening in the motor stator, and the aperture in end-plate 14, is passed through the openings in the parts just named in the above order and there rigidly clamped. While the parts are so held and with the longitudinal frame members welded to the field ring, the motor stator 27 is securely fastened in place by means of fusion welds 29, as shown in Figs. 1, 1a and 3. Thereafter the welds 20 are made, thus joining the ends of longitudinal frame members 18 and 19 with end-plates 10 and 14. Upon completion of the assembly of the mechanical structure of the apparatus of this invention as above described, an extremely rigid structure results, which is possessed of the high precision required in apparatus of this character and this without the necessity of resorting to elaborate machining operations. If desired, before withdrawal of the mandrel the same may be employed as a means for precisely locating the holes which are drilled in the end-plates 10 and 14 to receive the locating dowels 9 and 16.

To complete assembly of the apparatus it is only necessary to place bearing cage 7 in position and then pass the assembled rotating parts of the apparatus through the apertures in end plates 14, made large for that purpose, as above described. The bearing cage 13 is then located and bolted in place, as described. To further facilitate assembly and to provide a secure and accurate mounting for the brush carrier, bearing cage 7 is provided with a concentric, inwardly-projecting cylindrical portion 30, which is frictionally engaged by the split brush carrier 31 to which brush cages 32 are securely bolted. Projecting from a portion of brush carrier 31 is an adjusting rod 33 with adjusting handle 34, by means of which brushes may be shifted for control or adjusting purposes.

By reason of the polygonal configuration of the field ring 21, the apparatus of this invention has a special advantage in that the field windings used in conjunction therewith may be wound in a much more simple and economical manner. This is of special importance in the case of generators in which the field windings are relatively complicated, such, for example, as in the well-known Hansen type of welding generator. As clearly shown in Fig. 2, the Hansen type of field construction is shown embodied in the apparatus of this invention and constructed entirely of flat windings which are readily accommodated in the polygonal shape of the field ring 21. To this end, the sides of the ring 21 to which pole-pieces are attached, are provided with a main central pole-piece seat 35, which is in intimate low reluctance contact with intermediate pole-pieces 25. On either side of pole-piece seat 35 and spaced therefrom are the magnetic bridged seats 36, which also engage the intermediate pole-piece 25 but in a manner to introduce predetermined reluctance. This is accomplished, as shown in Fig. 2, by means of the arcuate grooves 37. In this way both the main field coil 38 and the regulating excitation coil 39 are perfectly accommodated without waste of material or space, in spite of their simple, flat form.

Between the pole-piece sides of field ring 21, integrally formed interpoles 40 project inwardly toward the armature in position to perform the usual regulating effect upon commutation. The windings 41 surrounding the interpoles 40 are passed through apertures provided therefor in the main pole-pieces, in accordance with the principles of the well-known Hansen type of welding generator. The windings 41, however, are made up as shown of flat ribbon conductor and by reason of the peculiar advantages of the apparatus of this invention, are advantageously formed as flat or "pancake" coils, thus avoiding the difficult operation of bending a coil of this character. The windings 41 may thus be very economically formed and assembled within the pole-pieces, simply by placing the same in the position shown prior to the step of securing the inner pole-piece members 26 in place. The windings 41 are securely held against undesirable movement by means of wedges 42.

Prior to the assembling of windings 41 within the main pole-pieces, the short circuit coupling coils 43 are inserted in place, as shown. These likewise are advantageously formed in the machine of this invention in a simple, flat configuration.

In order to securely unite the various parts forming the main pole-pieces, a solid anchoring-rod 44 is received within an aperture provided therefor in the intermediate pole-piece members 25. The rod 43, as shown clearly in Fig. 1, is pierced by a plurality of threaded holes into which fastening screws 45 pass, two from the exterior of the field ring 21 and two from the interior of the inner pole-piece members 26. In this way the pole-pieces are held together and secured to the field ring 21 in such manner that the various windings may be assembled within the pole-piece with great ease.

With the windings arranged as shown in the figures and above described, the windings 38 are supplied with current by shunt connection with the main brushes of the generator, while the windings 39 are supplied with current from auxiliary brushes spaced an appreciable angle from the main generator brushes. The windings 41, on the other hand, are in series connection with the main generator brushes so that the out-put current passes therethrough, causing said windings to act not only as interpole coils, but as regulating impedances by virtue of the substantial quantity of magnetic material disposed within the same. Rapid increases or decreases in current carried in these windings, furthermore, cause induced current to flow in the short circuited windings 43 in such manner as to aid, or oppose, the flux existing in the field, thus greatly improving the characteristics of the generator as a source of supply of welding current.

The polygonal form of field frame, in addition to facilitating the employment of simplified flat windings, is particularly well adapted to the accommodation of the novel pole-piece form herein disclosed. It will be noted that inner pole-piece members 26 and intermediate pole-piece members 25 are so disposed as to form greatly enlarged flanges through which windings 41 pass. In this way the magnetic material surrounding the windings 41 is substantial in amount and is displaced well away from and beyond the range of the areas of maximum flux density in the pole-pieces produced by armature cross-magnetization. These areas of maximum flux density occur along the arc of uniform air gap between pole-pieces and armature, being of marked intensity near the ends thereof, as roughly indicated by the numeral 46. The windings 41, being surrounded by magnetic material which is relatively free of the high density flux of cross-magnetization, which flux approaches or attains an amount sufficient to cause saturation under many conditions, are thus possessed of and exhibit enhanced impedance characteristics.

Due to this disposition of magnetic means and due to the fact that the load current passes through windings 41, marked improvement in the welding characteristics of the generator occurs. This occurs not only because of the enhanced energy storage properties of the load circuit, but also because of the intensification of the transient impulses induced in the short circuit coils 43. Through the novel arrangement of magnetic masses in accordance with this invention the many advantages of the Hansen type of structure are thus markedly improved.

It is here noted that the improved configuration of magnetic masses, through which the above advantages are obtained, requires space at particular locations surrounding the armature. These locations are such that a polygonal field frame very conveniently provides such space in the corners formed by the intersections of the polygon sides. While the polygonal field frame above described thus provides a most economical and compact form and one in which materials are employed to greatest advantage, it is obvious that the improved pole-piece of this invention will, nevertheless, operate with equal electrical advantage in field-rings of less compact shape.

From the above description it will be apparent that a generator of unusually rugged and rigid design may be constructed in accordance with this invention and one in which improved characteristics for welding purposes may be obtained. The longitudinal frame members, by reason of their secure attachment to the generator field, provide means for mounting end plates upon which the bearing for support of rotating parts may be accurately and permanently secured without need for complex machining operations. The large openings between longitudinal members are easily closed by flat panels, which can be quickly removed to permit access to all interior parts of the machine. The employment of longitudinal members in accordance with this invention gives rise to such rigidity of structure that center bearings in motor generators constructed in accordance therewith are not essential.

As an additional advantage of the apparatus of this invention, a polygonal field frame may be employed without sacrifice in compactness and without unnecessary weight. Furthermore, windings of flat form are easily and effectively employed. The flat form of winding thus availed of is more simply manufactured, is lower in cost, and is free of insulation failures caused by conforming operations.

While this invention has been fully shown and described herein by reference to a specific instance of an embodiment thereof, it is intended that protection to be granted hereon shall extend to the full limit of the inventive concept herein disclosed as measured by the scope of the claims appended hereto.

That which we claim as our invention is:

1. In a generator suitable for arc-welding current supply, the combination comprising a polygonal field frame composed of superimposed laminations, interpoles projecting inwardly from alternate sides of said polygonal frame, field pole-pieces projecting inwardly from the remaining sides of said field frame, said pole-pieces comprising an intermediate portion having a central area of low reluctance contact with said field frame, and lateral portions disposed on either side thereof and spaced therefrom in high reluctance contact with said field frame to provide an aperture for windings on either side of said central area, and a pole-face portion disposed upon the inward side of said intermediate portion in low reluctance contact therewith along the medial parts thereof and at the terminal portions thereof to provide an aperture for windings on each side of said pole-piece, an armature and commutator rotatably mounted within said field frame in magnetic relation to said pole-pieces and said interpoles, flat interpole coils surrounding said interpoles and passing through adjacent apertures in adjacent pole-pieces, a pair of main current brushes in contact with said commutator and in series connection with said interpole coils, a pair of auxiliary brushes in contact with said commutator, a pair of flat auxiliary field coils surrounding the central juncture between said intermediate pole-piece and said field frame and lying in the apertures there provided, said auxiliary coils being connected for current supply with said auxiliary brushes, a pair of main field coils of flat configuration surrounding said pole-pieces being in parallel connection with said main brushes, and a short-circuited transient inductor passing through one terminal aperture in each pole-piece and around the exterior of the opposite terminal portion of the same pole-piece.

2. In a generator suitable for arc-welding current supply, the combination comprising a rectangular field frame composed of superimposed laminations, a pair of interpoles projecting inwardly from two opposite sides of said rectangular frame, a pair of field pole-pieces projecting inwardly from the two remaining sides of said field frame, said pole-pieces comprising an intermediate portion having a central area in low reluctance contact with said field frame and lateral portions disposed on either side thereof and spaced therefrom in high reluctance contact with said field frame to provide an aperture for windings on either side of said central area, and a pole face portion disposed upon the inward side of said intermediate portion in low reluctance contact therewith along the medial part thereof and at the terminal portions thereof to provide an aperture for windings at each side of said pole-piece, an armature and commutator rotatably mounted within said field frame in magnetic relation to said pole-pieces and said interpoles, a pair of flat interpole coils surrounding said interpoles and passing through said apertures which are adjacent the terminal portions of said pole-pieces, a pair of main current brushes in contact with said commutator and in series connection with said interpole coils, a pair of auxiliary brushes in contact with said commutator, a pair of flat auxiliary field coils surrounding the central juncture between said intermediate pole-pieces and said field frame and lying in the apertures there provided, said auxiliary field coils being connected to said auxiliary brushes for current supply, a pair of main flat field coils surrounding said pole-pieces, being in parallel connection with the main load circuit, and a short-circuited transient conductor passing through one terminal aperture in each pole-piece and around the exterior of the opposite terminal portion of the same pole-piece.

3. In a generator, the combination comprising a generator field, longitudinal frame members secured to said field, supporting end-plates secured to the ends of said frame members on each side of said field, a rotatable shaft carrying a commutator and armature mounted to turn within said field, a bearing cage seat in said end-plate nearest said commutator, a bearing cage mounted therein having a concentric inwardly-projecting cylindrical collar, a bearing mounted in said cage for support of said rotatable shaft, a brush-mounting mounted upon said collar in frictional engagement therewith, a second bearing cage seat in the opposite end-plate, and a cage and bearing therein for mounting for rotation the opposite end of said rotatable shaft.

4. In a generator, the combination comprising a generator field, an end-plate on either side thereof and secured thereto, bearing cage seats in each of said end-plates, a bearing cage in one of said seats having a concentric inwardly-projecting cylindrical collar, a bearing cage in the seat in the opposite end-plate, a bearing in each bearing cage, rotatable generator parts having a commutator mounted to turn in said bearings with said commutator adjacent said inwardly projecting cylindrical collar, and a brush-mounting mounted upon said inwardly-projecting cylindrical collar.

5. In a generator, the combination comprising an armature, a field frame surrounding said armature, field poles projecting inwardly from said frame toward said armature, windings for said field poles, interpoles between said field poles projecting inwardly from said frame toward said armature, each field pole having a medial portion spaced a small distance from the periphery of said armature to form a flux gap, each field pole also having enlarged stabilizer portions on each side of said medial portion, said stabilizer portions being spaced from the periphery of said armature a distance substantially greater than the spacing of said flux gap, said stabilizer portions of said field poles having apertures therein, said apertures being displaced laterally entirely beyond said medial portion, and a combined interpole and stabilizer winding surrounding each interpole and passing through the adjacent field pole apertures.

6. In a generator, the combination comprising an armature, a rectangular field frame surrounding said armature, field poles disposed on opposite sides of said frame projecting inwardly therefrom toward said armature, windings for said field poles, interpoles projecting inwardly from the intermediate sides of said frame toward said armature, each field pole having a medial portion spaced a small distance from the periphery of said armature to form a flux gap between said pole and armature, each of said field poles also having enlarged stabilizer portions on each side of said medial portion extending from the midpoint of the pole a distance greater than the half diameter of said armature, said stabilizer portions being spaced from said armature a distance substantially greater than said flux gap spacing, said stabilizer portions of said pole pieces also having apertures therein, said apertures being displaced laterally from the midpoint of the pole entirely beyond the half diameter of said armature, and a combined stabilizer and interpole winding in the form of a flat coil surrounding each interpole and passing through the adjacent field pole apertures.

WILLIAM J. OESTERLEIN.
KARL A. BLIND.